ered by after-burners when these are effective at all.

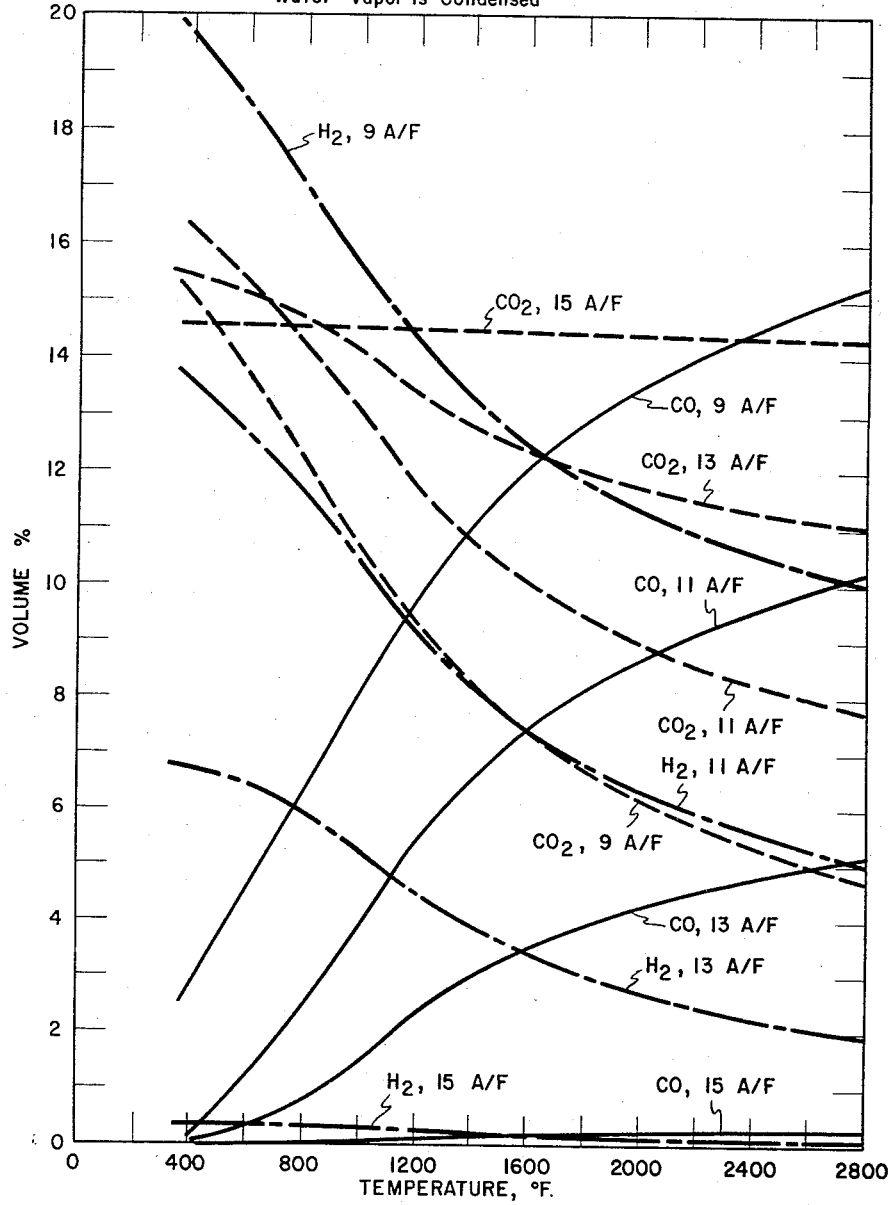

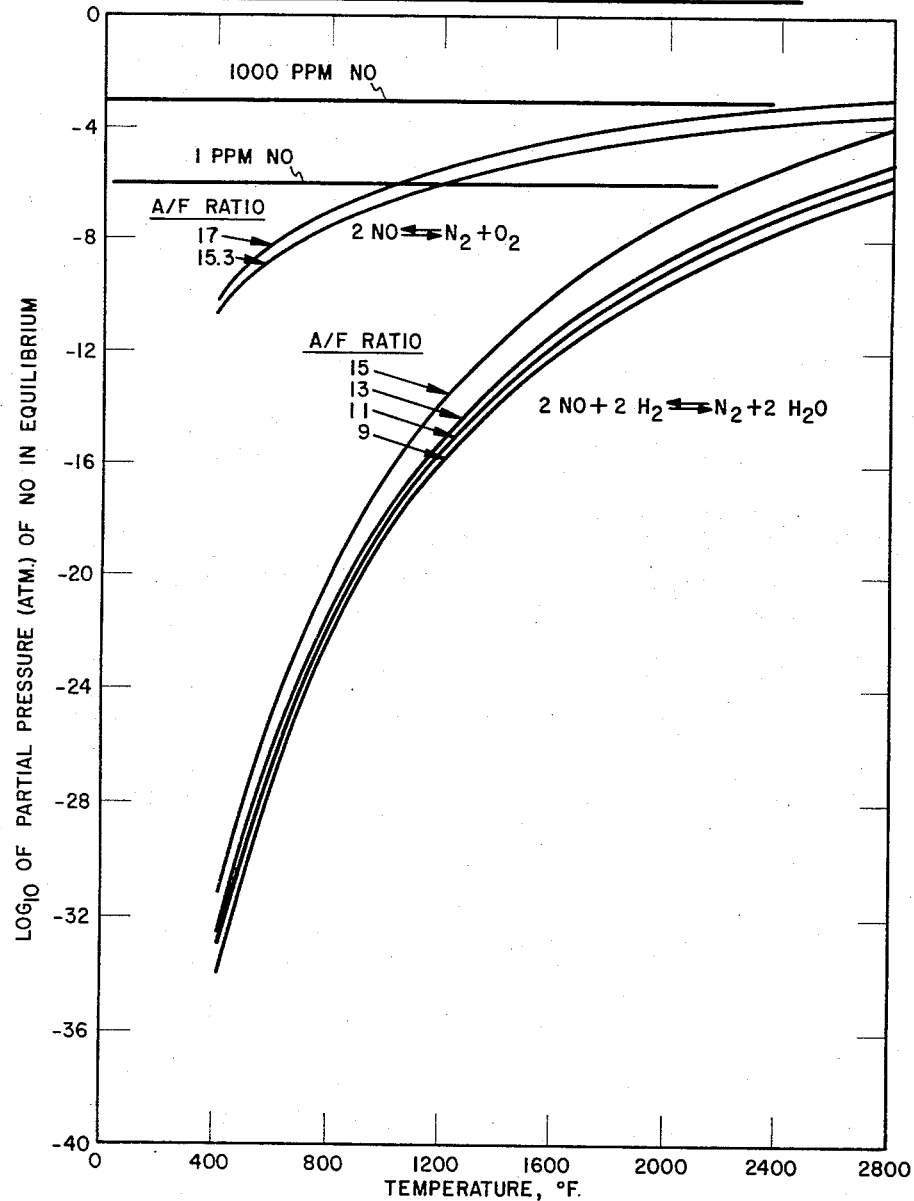

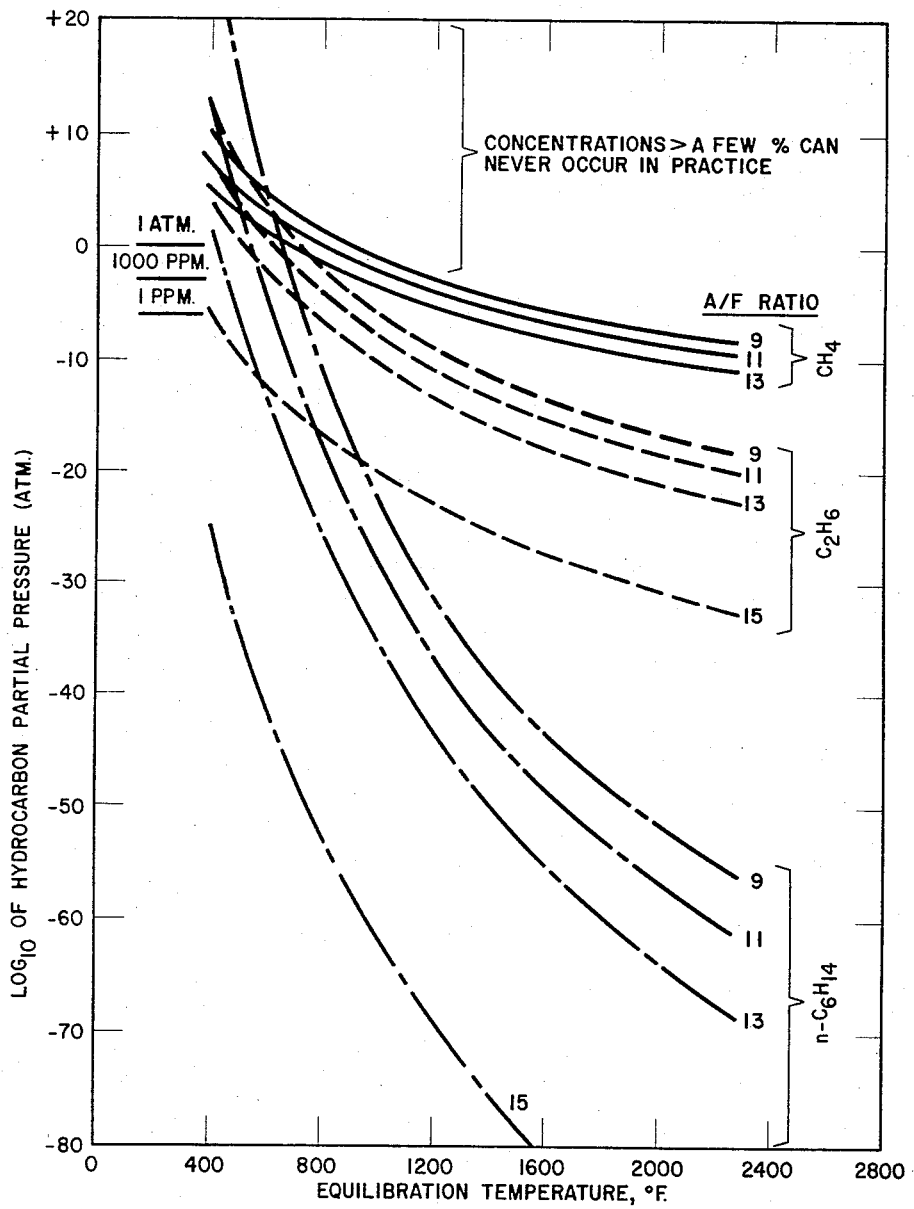

United States Patent Office
3,370,914
Patented Feb. 27, 1968

3,370,914
METHOD OF TREATING EXHAUST GASES OF INTERNAL COMBUSTION ENGINES
George P. Gross, Westfield, William F. Biller, East Brunswick, David F. Greene, Westfield, and Kenneth K. Kearby, Watchung, N.J., assignors to Esso Research and Engineering Company, a corporation of Delaware
Filed Nov. 20, 1963, Ser. No. 325,024
6 Claims. (Cl. 23—2)

ABSTRACT OF THE DISCLOSURE

Method of reducing the hydrocarbon, carbon monoxide and nitrogen oxide content of exhaust gases of internal combustion engines which additionally contain carbon dioxide, hydrogen, nitrogen and water and a small amount of oxygen wherein said gases are contacted with a catalyst without the addition of external air or oxygen. The catalyst promotes the reaction of carbon monoxide with the water to form carbon dioxide and hydrogen, the reaction of the hydrocarbons with water to form carbon dioxide and water and the reduction of the nitrogen oxides to nitrogen. Exemplary catalysts are town gas catalysts and water-gas shift reaction catalysts such as chromium oxide-iron oxide and nickel on alumina promoted with an alkali or alkaline earth metal.

---

This invention relates to a method of reducing and in some instances substantially eliminating harmful components of gases. In particular, the invention relates to methods of reducing harmful components of exhaust gases from internal-combustion engines without changing the mixture strength (i.e., the air/fuel ratio) delivered by the carburetor and without the addition of supplemental air (oxygen) in the exhaust stream.

Even more particularly, the invention relates to the discovery that reduction or substantial elimination of such harmful constituents can be achieved by catalytically effecting a redistribution of available oxygen (even if chemically bound) so that $CO_2$, hydrogen, and in some cases methane, which are harmless, are increased at the expense of water, while harmful CO, hydrocarbons having a carbon number of two or more, NO and other nitrogen oxides become small. This novel method of air pollution abatement is designated as equilibration, since it consists of catalytically achieving a gas composition approaching true thermodynamic equilibrium between the substances present.

The exhaust gas from an internal-combustion engine contains $N_2$, $CO_2$, $H_2O$, CO, and $H_2$ in amounts commonly in excess of 1 mol percent by volume, together with lesser amounts of nitrogen oxides (especially NO), $O_2$, and unburned hydrocarbons. Additional other compounds may be present in small amounts, but these are not relevant to the invention. Because of charge-stratification, flame-out, and wall quenching of flames, all of these constituents are normally present whether the engine is supplied with somewhat less than the stoichiometric amount of air (rich mixture) or somewhat more than this amount (lean mixture).

Normally, most engine operation is under rich mixture conditions. Rich mixture operation is essential for smooth performance of the engine at idle and light load, is essential for high power ouput at full load, and is also frequently necessary for the suppression of knock in the combustion process. When running lean, e.g., to achieve fuel economy under moderate load cruising conditions, CO and $H_2$ will fall below 1 mol percent, $O_2$ may rise above 1%, NO and other nitrogen oxides will increase, and hydrocarbons will diminish, although not to zero, from the more usual rich mixture conditions. In either case, concentrations of $CO_2$ and $H_2O$ are almost invariably in excess of 10 mol percent each, while $N_2$ typically comprises about 70 mol percent of the exhaust gas.

Among the above constituents of exhaust gas, CO, hydrocarbons, and nitrogen oxides (e.g. NO) are considered as undesirable from an air pollution standpoint. Carbon monoxide (CO) is harmful for its toxic properties, NO is also physiologically harmful. Hydrocarbons and NO are additionally harmful, even though present in very small amounts, because they participate in a sequence of photochemical reactions which eventuate in the formation of eye-irritating, crop-damaging, visibility-reducing smog. These problems become acute in urban areas where local meteorological conditions prevent the normal upward convective movement of ground-level air for long time periods. The recent and foreseeable future increases in automotive population density in urban areas, with the attendant increase in exhaust emissions, make essential the discovery of effective solutions to these problems through reduction in the amounts of CO, hydrocarbons, and NO discharged from an automotive exhaust.

The usual, and widely studied and evaluated, approaches to these problems are based upon the fact that most engine operation is under rich-mixture conditions, i.e., there is usually too little oxygen present for the conversion of all hydrocarbons to $CO_2$ and $H_2O$. Thus, one approach adjusts the carburetor toward leaner operation and also makes certain other adjustments of the engine. This approach can reduce CO and hydrocarbons, but probably will increase NO and can result in engine performance that is inferior to that obtained with a richer mixture.

Another approach adds a controlled amount of additional air outside the engine combustion chamber, i.e., in the exhaust stream, and then seeks to oxidize CO and hydrocarbons, either catalytically or thermally (the latter either with or without a true flame) by action of the oxygen in the added air, again, NO can be increased by this approach.

One of the major difficulties in the oxidation, by added air, either catalytically or by a flame, of the CO and hydrocarbons (and $H_2$, as well) in the exhaust gas of an engine is the substantial amount of heat released by the reaction. Overheating of equipment and irreparable damage are the result. Avoiding such overheating necessitates by-pass devices which defeat the objectives of the equipment.

By contrast, equilibration reactions, taken as a whole, are very mildly exothermic. The hydrocarbon-water reaction is endothermic, and the NO and water-gas shift reactions are mildly exothermic. Another advantage for equilibration is that a mechanism to inject additional air is not needed.

When equilibration is effected by a fuel additive, the ultimate in control of automobile exhaust emissions can be achieved without any new or modified vehicle equipment.

Thus, in sum, the present invention of exhaust gas equilibration for control of air pollution caused by automotive exhaust offers a number of significant advantages over thermal and catalytic afterburners in which secondary air (oxygen) is added to the exhaust to complete the oxidation of carbon monoxide and hydrocarbons. These are:

(1) Exhaust equilibration can control three major exhaust pollutants in a single process. These are carbon monoxide, hydrocarbons, and nitric oxides.
(2) No pump means is needed to supply secondary air.
(3) The overall equilibration reactions are only slightly exothermic as compared to the substantial heat release from oxidative converters. Thus, the exhaust equilibration system can operate several hundred degrees cooler and will not require the use of expensive heat resistant alloys, or of complicated by-pass systems to prevent damage to the catalyst from excessive temperatures.

Because of the complex variety of reacting chemical species and the complex variety of available alternate reactions, the exact reaction mechanisms by which these changes occur in the use of our invention cannot be set forth. However, it appears that the ultimate effect of the invention, without seeking to specify the intermediate chemical steps, is to produce a mixture of gases in the exhaust that is more nearly in line with the true equilibrium composition to be expected in the general temperature within the range of about 400° F. to 1400° F.

In achieving this effect, the function of the catalyst is that of facilitating the achievement of equilibrium in exhaust gases where the equilibrium-seeking reactions have essentially been quenched. Such quenching, which leaves a portion of the gases unreacted and other portions in forms and concentrations corresponding to equilibria that exist at much higher temperatures, is the essential reason for the problem of air pollution by automotive exhaust gases.

The catalysts of the invention can be introduced in the fuel in the form of fuel-soluble additives, or they can be supplied separately and mixed with the intake air-fuel mixture by suitable equipment which is added to the intake system of the engine.

In either case, the catalyst can exert its effect within the engine combustion chamber or in the exhaust gas after it leaves the engine. Where such action occurs outside the combustion chamber, a suitable residence time at suitable temperatures is provided by suitable configurations of the exhaust ducts, muffler, etc. The catalyst may act to some degree in both locations.

Similarly, the catalysts, in suitable form, can be injected into the exhaust stream outside the engine exhaust port.

Alternatively, catalysts of our invention may be placed in an exhaust-gas reactor (catalytic converter) installed as part of the engine exhaust system. In this case, the catalyst can be suitably supported by and dispersed upon a support material, usually a porous one, such as an alumina, diatomaceous earth, clay, molecular sieve and the like.

In an alternate embodiment of the invention, the catalyst, or catalyst combination, or at least one of the components of a mixed catalyst, is supplied in the intake mixture as mentioned above and a catalytic converter is used in the exhaust to accumulate, and facilitate the action of, the catalyst, which is constantly replenished via the material supplied to the intake. In this case, the catalytic converter can contain a substantially inert, porous material, which may or may not itself be impregnated with catalyst or with one or more components of a mixed catalyst.

Thus, the converter can contain a catalyst on a support, while the fuel can supply and constantly add additional catalytic material to enhance the action of the catalyst. The term "catalyst" as used herein and in the claims is broad enough in definition to include components which are precursors of the active catalysts and form the active catalysts under operating conditions.

The catalysts of this invention include one or more of those metals, metal oxides or hydrous oxides, or the inorganic, organic or organometallic compounds capable of yielding, by reaction within the engine or exhaust-duct environment, those metals or metal oxides chosen from the class consisting of metals having atomic numbers from 3 through 58, inclusive, the class consisting of tungsten, rhenium, osmium, iridium, platinum, gold, mercury, thallium, lead, and bismuth is preferred.

Compounds of non-metals, especially phosphorus, sulfur, and the halogens may also be present in the fuel, and may enhance the action of some metallic catalysts, modify their effect upon engine performance and durability, or otherwise exert a beneficial effect.

Effective catalysts for use in this invention are those known in the art for use as water-gas shift reaction catalysts and town gas catalysts. A typical water-gas shift catalyst will contain about 8% by weight of $Cr_2O_3$ and about 92% by weight of $Fe_2O_3$. A typical town gas catalyst comprises 20 to 30 wt. percent nickel on alumina promoted with a small amount of an alkali or alkaline earth oxide, for example a decomposable potassium compound such as potassium carbonate or, for example, to contain 3 to 20 wt. percent barium. Combinations of water-gas shift reaction catalysts and town gas catalysts can be made if desired in any desired proportions. Under some conditions, such a combination is preferred.

Particularly preferred fixed bed catalysts for exerting the equilibration effect of this invention are those which contain ruthenium or nickel as the active component. Such a ruthenium catalyst will contain about 0.01 to 10, preferably 0.1 to 2.0 weight percent ruthenium on a support such as silica gel, activated alumina, MgO, carbon, zirconium oxide, diatomaceous earth, pumice, or any other well-known catalyst support. This catalyst may be promoted by the addition of about 0.1 to 20, preferably 0.5 to 10 weight percent of an alkaline compound, such as KOH, $K_2CO_3$, or any other decomposable compound of potassium, Rb, Cs or Ba. All weight percents, unless otherwise indicated, are based on the total weight of the catalyst which includes the support material.

It is also possible to use ruthenium in combination with elements such as iron, nickel, or cobalt on the above supports. Ruthenium is less readily oxidized and has less tendency to react with the support. Ruthenium may be impregnated on supports or coprecipitated with the support. It is within the scope of the invention to add any of these catalyst components in the form of a fuel additive in any form which will be most effective. It is contemplated that this can be achieved either by using catalysts soluble in the fuel or catalysts which are added to the fuel in extremely finely divided particles and carried in the fuel as a colloidal dispersion.

Thermodynamic analysis shows that substantial reductions in carbon monoxide (CO) and virtually total elimination of nitric oxide (NO) and hydrocarbons (HC), except methane, in automotive exhaust gas are possible by promoting the maintenance of equilibrium in the following reactions:

(1) $$CO_2 + H_2 \leftrightarrows CO + H_2O$$
(2) $$2NO + 2H_2 \leftrightarrows N_2 + 2H_2O$$

or $$2NO \leftrightarrows N_2 + O_2$$

and (3) $$HC + aH_2O \leftrightarrows bCO_2 + cH_2$$

or $$HC + dCO_2 \leftrightarrows eCO + fH_2O \leftrightarrows gCO_2 + hH_2$$

These reactions will be discussed quantitatively in terms of the combustion products at various carbureted mixture ratios to show the extent of "clean-up" obtained through promoting these equilibria by either a fixed-bed catalyst or a catalytic smoke resulting from a fuel additive.

Hydrocarbons can be reduced to extremely low levels by maintaining the equilibrium between hydrocarbons and the $H_2O$, $CO_2$, CO, and $H_2$ in equilibrated exhaust gas, provided the hydrocarbon equilibrium is quenched at or above about 800° F. Below this temperature, hydrocarbon synthesis, especially of methane, will occur in increasing amounts if thermodynamic equilibrium is maintained. This is not a problem, however, since methane, which would be the principal synthesis product, is not a factor in air pollution or smog formation. Above 900° F., even for a relatively rich mixture, methane is the only hydrocarbon with an equilibrium concentration above 1 part per million by volume (p.p.m.) in the exhaust gas.

The conventional reduction of air pollution by automotive exhaust gas consists, essentially, of the reduction of the concentrations of carbon monoxide (CO) and hydrocarbons (HC). Reduction of the concentration of nitrogen oxides (NO, principally) is desirable, as well, but constitutes a somewhat separate problem which is not attacked by the oxidative converters, which seek to effect reactions with oxygen present in added air, now under test for use in California. From a pollution standpoint, there is no known objection to the other exhaust-gas constituents: nitrogen, carbon dioxide, water vapor, and hydrogen. Of the hydrocarbons, methane will not cause air pollution or photochemical smog.

The concentrations of $CO$, $CO_2$, $H_2$, and $H_2O$ vapor in the exhaust of an engine are related through the water-gas shift reaction:

$$CO_2 + H_2 \rightleftharpoons CO + H_2O$$

for which the equilibrium constant may be written:

$$K = \frac{(CO)(H_2O)}{(CO_2)(H_2)}$$

The parentheses indicate partial pressures or concentrations in the gas phase. Numerous studies of the composition of engine exhaust gas obtained with less than the stoichiometric $A/F$ ratio (i.e., for rich mixture) show that K has apparent values between 3 and 4 for all engines, fuels, and running conditions. A commonly accepted value is 3.8, and it is on this basis, together with allowance for a small amount of hydrocarbon (originally regarded as methane), that charts, well-knwon in the art of engine and fuel research, for the interpretation of Orsat analyses of exhaust gases in terms of $A/F$ ratios are constructed.

The constancy of the apparent values of K can only be the result of the quenching of the water-gas shift equilibrium at a temperature of about 1750° K. (2690.6° F., 3150° R.). As the gas cools in the exhaust line, the true value of the equilibrium constant decreases, and if the equilibrium were not quenched, there would be an amount of CO, for example, found which would decrease with temperature.

Thus, a suitable catalyst, either in the form of a fuel additive or in a fixed bed located in the exhaust duct, which maintains equilibrium as the exhaust gas cools, will result in a reduction of carbon monoxide (CO) and water, and an increase in $CO_2$ and $H_2$. This would achieve one aspect of air pollution abatement.

The other desired aims of pollution abatement (elimination of NO and HC) can be achieved by maintaining, through catalysis, certain other equilibria. For example, the values of K at various temperatures for the reaction:

$$2NO + 2H_2 \rightleftharpoons N_2 + 2H_2O$$

are such that the concentration of NO should be very small (below 1 p.p.m.) in equilibrated exhaust gas below about 2200° F. under conditions of rich mixture combustion. A similar conclusion is reached from the values of K for:

$$2NO \rightleftharpoons N_2 + O_2$$

which applies in lean-mixture combustion. However, in this case, an NO concentration of 1 p.p.m or less requires that equilibrium be maintained down to about 1200° F.

Similarly, the values of K at various temperatures for the general reactions $$aHC + bH_2O \rightleftharpoons cCO_2 + dH_2$$

and $$aHC + bCO_2 \rightleftharpoons cCO + dH_2O$$

show that the existence of any significant amount of any of the hydrocarbons is thermodynamically unstable above about 800° F. in the presence of the amounts of CO, $CO_2$, $H_2$, and $H_2O$ that are present in the exhaust, regardless of whether the latter are in stable equilibrium or not. For equilibrated exhaust gas from very rich mixtures, at temperatures well below 800° F., appreciable HC (particularly methane) could, in principle, exist in equilibrium with the other gases. However, if equilibrium is maintained as the gas cools from a higher temperature, the HC would already be substantially zero at 800° F., and the CO, $CO_2$, $H_2O$, and $H_2$ do not react at low temperatures to form any hydrocarbon more complex than the harmless methane in any appreciable amount.

These considerations, then, indicate qualitatively that the maintenance of equilibrium conditions, by catalysis, in a cooling exhaust gas can substantially reduce or eliminate atmospheric pollution by automotive exhaust.

In contrast to this approach, that of oxidation by catalysis or an auxiliary flame, with added air, also eliminates HC and CO (and $H_2$ as well) but does not effect a reduction in NO.

An outline of the calculations used to place the equilibration concept of pollution abatement on a quantitative basis follows. These calculations include the extent of "clean-up" as a function of the temperature to which the exhaust is equilibrated. Various initial $A/F$ ratios have been assumed, largely on the rich side of stoichiometric, but including two lean mixture ratios in connection with the NO equilibria. All thermodynamic quantities used are from tables in American Petroleum Institute, Research Project 44, "Selected Values of Physical and Thermodynamic Properties of Hydrocarbons and Related Compounds." Calculations were made by methods well-known in the art of thermodynamics.

THE WATER-GAS SHIFT EQUILIBRIUM

The equilibrium values of $K_{eq}$ at various temperatures from 500° K. (440.6° F.) to 1750° K. (2690.6° F.) were evaluated for the reaction:

$$CO_2 + H_2 \rightleftharpoons CO + H_2O$$

The resulting values of $K_{eq} = (CO)(H_2O)/(CO_2)(H_2)$ are shown in Table A below for selected values of temperature.

TABLE A

| T, °F | 440.6 | 800.6 | 1,160.6 | 1,520.6 | 2,690.6 |
|---|---|---|---|---|---|
| T, °K | 500 | 700 | 900 | 1,100 | 1,750 |
| $K_{eq}$ | 0.0076 | 0.111 | 0.453 | 1.054 | 3.705 |

It is evident from these values that the equilibrium concentration of CO diminishes with temperature.

In solving the combustion equation, several assumptions were made:

(1) Isooctane ($C_8H_{18}$, stoichiometric $A/F = 15.11$) was selected as the fuel.

(2) Air/fuel ratios of 15, 13, 11, and 9 lbs. air/lb. fuel were used. These represent fractional oxygen deficiencies (E) of 0.0073, 0.140, 0.272, and 0.404, respectively.

(3) All combustion is to CO, $CO_2$, $H_2$, and $H_2O$, with $N_2$ present from the air. No hydrocarbon or NO is assumed at this point, and since all cases have a deficient air-supply, there is assumed to be no free $O_2$.

If $x$ is the fraction of carbon present as CO, and $y$ is the fraction of hydrogen present as $H_2$, then the water-gas equilibrium constant can be written $$K = x(1-y)/y(1-x)$$

from which it can be shown that $$y = \frac{x}{K - (K-1)x}$$

For the combustion reaction:

$$C_8H_{18} + 12.5(1-E)O_2 \rightleftharpoons 8xCO + 8(1-x)CO_2$$
$$+ 9yH_2 + 9(1-y)H_2O + (4x + 4.5y - 12.5E)O_2$$

since free $O_2$ is zero, it follows that $$4x + 4.5y - 12.5E = 0$$

If we substitute for $y$ in terms of $K$ and $x$ and rearrange, then $$8x^2(K-1) - x(9 + 8K + 25E(K-1)) + 25EK = 0 \;^1$$

[1] See Lichty, L. C., "Internal Combustion Engines," 6th ed., McGraw-Hill (1951), p. 153.

This quadratic equation has then to be solved for each of the 4 selected E values and 7 calculated K values (as in Table A, for 7 selected temperature), to give 28 values of $x$. Corresponding $y$ values are then calculated from each $x$ and the appropriate K, and it will be found, as a check, that $4x + 4.5y - 12.5E = 0$, as required. The composition of the product gas, for any selected E and temperature, is then given by:

$CO_2 = 8(1-x)$ moles
$CO = 8x$ moles
$H_2O = 9(1-y)$ moles
$H_2 = 9y$ moles
$O_2 =$ zero
$N_2 = 3.76 \times 12.5(1-E)$ moles These quantities may then be combined to give mole percent or volume percent exhaust gas compositions on either a "wet" basis (water present as vapor) or a "dry" basis (all water vapor is condensed, and percent values are relative to the remaining gases). Both bases are useful, since most gas analyses (e.g., Orsat) are on a dry basis, but any further reactions of components with hydrocarbon or with nitrogen oxides have to be examined in terms of the wet analysis.

Tables B and C which follow show the volume percent concentrations of the above constituents on wet-gas and dry-gas bases, respectively, for the four assumed A/F ratios (by weight) of 9, 11, 13, and 15, when the exhaust gas is equilibrated to the seven selected temperatures.

TABLE B.—COMPOSITION OF EQUILIBRATED EXHAUST GAS (WET-GAS BASIS, VOLUME PERCENT)

[Varying A/F ratio and temperature]

| Gas | A/F | T., °F. | | | | | | |
|---|---|---|---|---|---|---|---|---|
| | | 441 | 801 | 1,161 | 1,521 | 1,881 | 2,241 | 2,691 |
| | | T., °K. | | | | | | |
| | | 500 | 700 | 900 | 1,100 | 1,300 | 1,500 | 1,750 |
| CO | 9 | 3.13 | 6.01 | 8.78 | 10.68 | 11.91 | 12.73 | 13.40 |
| | 11 | 0.33 | 2.37 | 4.70 | 6.36 | 7.44 | 8.17 | 8.76 |
| | 13 | 0.07 | 0.76 | 1.95 | 2.94 | 3.60 | 4.03 | 4.38 |
| | 15 | 0.002 | 0.03 | 0.08 | 0.14 | 0.18 | 0.20 | 0.22 |
| $CO_2$ | 9 | 14.65 | 11.77 | 8.99 | 7.09 | 5.87 | 5.05 | 4.37 |
| | 11 | 15.29 | 13.25 | 10.91 | 9.26 | 8.19 | 7.45 | 6.86 |
| | 13 | 13.87 | 13.18 | 11.98 | 10.99 | 10.34 | 9.91 | 9.56 |
| | 15 | 12.57 | 12.54 | 12.48 | 12.43 | 12.39 | 12.37 | 12.35 |
| $H_2$ | 9 | 19.34 | 16.44 | 13.66 | 11.76 | 10.52 | 9.72 | 9.06 |
| | 11 | 12.95 | 10.86 | 8.56 | 6.92 | 5.83 | 5.11 | 4.52 |
| | 13 | 6.04 | 5.35 | 4.14 | 3.17 | 2.51 | 2.07 | 1.72 |
| | 15 | 0.29 | 0.26 | 0.21 | 0.15 | 0.11 | 0.09 | 0.07 |
| $H_2O$ | 9 | 0.66 | 3.56 | 6.34 | 8.24 | 9.48 | 10.28 | 10.94 |
| | 11 | 4.62 | 6.71 | 9.02 | 10.65 | 11.74 | 12.46 | 13.06 |
| | 13 | 9.64 | 10.33 | 11.54 | 12.51 | 13.17 | 13.61 | 13.95 |
| | 15 | 13.85 | 13.87 | 13.93 | 13.99 | 14.03 | 14.05 | 14.07 |
| $N_2$ | 9 | 62.23 | 62.23 | 62.23 | 62.23 | 62.23 | 62.23 | 62.23 |
| | 11 | 66.81 | 66.81 | 66.81 | 66.81 | 66.81 | 66.81 | 66.81 |
| | 13 | 70.39 | 70.39 | 70.39 | 70.39 | 70.39 | 70.39 | 70.39 |
| | 15 | 73.29 | 73.29 | 73.29 | 73.29 | 73.29 | 73.29 | 73.29 |

TABLE C.—COMPOSITION OF EQUILIBRATED EXHAUST GAS (DRY-GAS BASIS, VOLUME PERCENT)

[Varying A/F ratio and temperature]

| Gas | A/F | T., °F. | | | | | | |
|---|---|---|---|---|---|---|---|---|
| | | 441 | 801 | 1,161 | 1,521 | 1,881 | 2,241 | 2,691 |
| | | T., °K. | | | | | | |
| | | 500 | 700 | 900 | 1,100 | 1,300 | 1,500 | 1,750 |
| CO | 9 | 3.15 | 6.23 | 9.37 | 11.64 | 13.16 | 14.18 | 15.05 |
| | 11 | 0.34 | 2.54 | 5.17 | 7.12 | 8.42 | 9.33 | 10.08 |
| | 13 | 0.07 | 0.84 | 2.20 | 3.36 | 4.14 | 4.66 | 5.08 |
| | 15 | 0.002 | 0.031 | 0.097 | 0.16 | 0.21 | 0.23 | 0.25 |
| $CO_2$ | 9 | 14.74 | 12.20 | 9.60 | 7.73 | 6.48 | 5.63 | 4.91 |
| | 11 | 16.03 | 14.20 | 12.00 | 10.37 | 9.27 | 8.51 | 7.89 |
| | 13 | 15.35 | 14.69 | 13.54 | 12.56 | 11.90 | 11.47 | 11.11 |
| | 15 | 14.59 | 14.56 | 14.50 | 14.45 | 14.41 | 14.39 | 14.37 |
| $H_2$ | 9 | 19.46 | 17.04 | 14.58 | 12.81 | 11.62 | 10.83 | 10.17 |
| | 11 | 13.58 | 11.64 | 9.41 | 7.75 | 6.61 | 5.84 | 5.19 |
| | 13 | 6.68 | 5.96 | 4.68 | 3.62 | 2.89 | 2.40 | 2.00 |
| | 15 | 0.33 | 0.31 | 0.24 | 0.17 | 0.13 | 0.10 | 0.08 |
| $N_2$ | 9 | 62.65 | 64.53 | 66.44 | 67.82 | 68.75 | 69.36 | 69.88 |
| | 11 | 70.04 | 71.62 | 73.43 | 74.77 | 75.69 | 76.32 | 76.84 |
| | 13 | 77.92 | 78.50 | 79.57 | 80.46 | 81.07 | 81.48 | 81.80 |
| | 15 | 85.08 | 85.10 | 85.16 | 85.22 | 85.25 | 85.28 | 85.30 |

The dry-gas concentrations of CO, $CO_2$, and $H_2$ at the various A/F ratios are plotted as a function of equilibration temperature in FIGURE 1. The values of the high-temperature end of the plot are in good agreement with those on the standard Orsat interpretation chart, except for the fact that the chart assumes (as we do not at this point) that a small amount of unburned hydrocarbon (methane) is present. Thus, the right ends of the lines in FIGURE 1 serve as the starting point in the equilibration attack on exhaust pollution. The following data in Table D from FIGURE 1 are indicative of the reduction of exhaust CO by an equilibration catalyst.

TABLE D

| A/F Ratio | Equil. Temp., °F. | Percent CO | Percent Reduction |
|---|---|---|---|
| 11 | 2,700 | 10.1 | ——— |
| | 1,000 | 4.1 | 60 |
| | 800 | 2.54 | 75 |
| | 600 | 1.21 | 88 |
| 13 | 2,700 | 5.1 | ——— |
| | 1,000 | 1.5 | 71 |
| | 800 | 0.84 | 84 |
| | 600 | 0.38 | 93 |

It is apparent from the foregoing that a catalyst sufficiently active to equilibrate down to temperatures of 600–1000° F. will effect a substantial reduction in CO emissions. Directionally, the lower temperature is better, of course, but introduces two complications: the rate of reaction would be lower, and the possibility of hydrocarbon synthesis, or less removal of hydrocarbon, increases. The hydrocarbon aspects of the question are treated later and $N_2$, expressed as partial pressures in atmospheres on the assumption that the exhaust-gas pressure is one atmosphere, can be used with the proper K value for the $2NO+2H_2$ reaction to calculate the partial pressures of NO (in atmospheres) that would be in thermodynamic equilibrium at that temperature. Results of this calculation are shown in Table F which follows and are plotted in $\log_{10}$ form in FIGURE 2.

TABLE F.—EQUILIBRIUM NITRIC OXIDE CONCENTRATIONS [1]

| | Partial Pr. (atm.) of NO in equilibrium with equilibrated exhaust gas a 1 atm. exhaust pressure | | | | | | |
|---|---|---|---|---|---|---|---|
| T., °F | 441 | 801 | 1,161 | 1,521 | 1,881 | 2,241 | 2,691 |
| T., °K | 500 | 700 | 900 | 1,100 | 1,300 | 1,500 | 1,750 |
| A/F Ratio: | | | | | | | |
| 9 | $5.62 \times 10^{-34}$ | $3.60 \times 10^{-23}$ | $2.97 \times 10^{-17}$ | $1.67 \times 10^{-13}$ | $6.50 \times 10^{-11}$ | $5.12 \times 10^{-9}$ | $2.93 \times 10^{-7}$ |
| 11 | $6.02 \times 10^{-33}$ | $1.06 \times 10^{-22}$ | $6.99 \times 10^{-17}$ | $3.81 \times 10^{-13}$ | $1.51 \times 10^{-10}$ | $1.22 \times 10^{-8}$ | $7.27 \times 10^{-7}$ |
| 13 | $2.81 \times 10^{-32}$ | $3.41 \times 10^{-22}$ | $1.90 \times 10^{-16}$ | $1.01 \times 10^{-12}$ | $4.04 \times 10^{-10}$ | $3.38 \times 10^{-8}$ | $2.08 \times 10^{-6}$ |
| 15 | $8.66 \times 10^{-31}$ | $9.47 \times 10^{-21}$ | $4.70 \times 10^{-15}$ | $2.47 \times 10^{-11}$ | $1.00 \times 10^{-8}$ | $8.63 \times 10^{-7}$ | $5.51 \times 10^{-5}$ |

[1] Isooctane fuel at indicated A/F ratio yields an exhaust gas which is equilibrated (as to CO, $CO_2$, $H_2$, and $H_2O$ in the water-gas shift reaction) at the indicated temperature and at 1 atmosphere total pressure. The equilibrium concentrations of $N_2$, $H_2$, and $H_2O$ thus found for each case are combined with the appropriate $K_{eq}$ for $2NO+2H_2 \rightleftharpoons N_2+2H_2O$ to find the equilibrium pressure for NO at each temperature and A/F ratio.

herein. However, it should be noted that the synthesis of methane at lower temperatures is at the expense of CO and $H_2$ and thus serves to further drive down the amount of CO that would be found in the equilibrated exhaust.

NITROGEN OXIDE ELIMINATION

Table E below shows calculated values of $K_{eq}$ at selected temperatures for the two reactions:

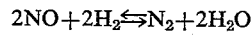

and

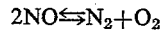

TABLE E.—NITRIC OXIDE EQUILIBRIA

| Reactants | Values of $K_{eq}$ | | | |
|---|---|---|---|---|
| | T., °F. | | | |
| | 440.6 | 800.6 | 1,160.6 | 2,690.6 |
| | T., °K. | | | |
| | 500 | 700 | 900 | 1,750 |
| $2NO+2H_2$ (Rich) | $2.3 \times 10^{63}$ | $2.3 \times 10^{43}$ | $1.5 \times 10^{32}$ | $1.1 \times 10^{13}$ |
| 2NO (Lean) | $3.9 \times 10^{17}$ | $1.5 \times 10^{12}$ | $1.5 \times 10^{9}$ | $1.2 \times 10^{4}$ |

The first reaction, which applies in the common rich-mixture carburetion situation, has been used for the cases mentioned above (A/F ratios of 15, 13, 11, and 9), and the second equation has been applied to two lean-mixture (15.3 A/F and 17 A/F, where 15.11 is stoichiometric) cases. The calculated K values (Table E), for both equilibria, show that directionally at low temperatures the existence of appreciable NO is not thermodynamically stable.

These values from Table E show that NO will react very completely by one or the other of the above reactions in the presence of suitable catalyst. If the exhaust-gas at four different A/F ratios (all rich) has been equilibrated catalytically to any of the selected temperatures, the resulting (wet-gas basis) concentrations of $H_2$, $H_2O$, These concentrations are to be compared with the typical $10^{-3}$ atmospheres (1000 p.p.m.) concentration of NO found in exhaust gas as it now exists. The value of a catalyst which equilibrates the reaction of NO with hydrogen during rich-mixture operation is obvious since the concentration of NO is thereby made substantially zero.

FIGURE 2 includes similarly calculated plots of NO concentration vs. temperature for lean A/F ratios. With a lean ratio, the exhaust contains $O_2$, but no $H_2$, and NO removal becomes more difficult. The equilibrium $$2NO \rightleftharpoons N_2+O_2$$

must be maintained to about 1200° F. or lower to get to 1 p.p.m. NO when in the lean-mixture condition.

ELIMINATION OF HYDROCARBONS

Table G which follows shows the calculated values of $\log_{10} K_{eq}$ at various temperatures for several examples of two general types of reaction:

$$aHC+bH_2O \rightleftharpoons cCO_2+dH_2$$

and $$aHC+bCO \rightleftharpoons cCO+dH_2O$$

TABLE G.—EQUILIBRIUM CONSTANTS [1] FOR HYDROCARBON REACTIONS WITH $H_2O$ OR $CO_2$

| Temp., °F | 440.6 | 620.6 | 800.6 | 980.6 | 1,160.6 | 1,340.6 | 1,520.6 | 1,700.6 | 1,880.6 | 2,060.6 | 2,240. |
|---|---|---|---|---|---|---|---|---|---|---|---|
| Temp., °K | 500 | 600 | 700 | 800 | 900 | 1,000 | 1,100 | 1,200 | 1,300 | 1,400 | 1,5006 |
| A. $\begin{bmatrix} C_nH_m+2nH_2O \rightleftharpoons \\ nCO_2+(2n+m/2)H_2 \end{bmatrix}$ | | | | | | | | | | | |
| $CH_4$, Methane | −7.9411 | −4.869 | −2.6167 | −0.901 | +0.4599 | +1.465 | +2.4751 | 3.242 | 3.8959 | 4.458 | 4.9501 |
| $C_2H_6$, Ethane | −8.5171 | −3.555 | +0.0743 | +2.846 | +5.0440 | +6.824 | +8.2961 | | 10.5878 | 11.493 | 12.2989 |
| $C_6H_{14}$, n-Hexane | −14.712 | | +8.120 | | +21.275 | | +29.859 | | 35.888 | | 40.364 |
| $C_2H_4$, Ethylene | | +1.889 | | +5.188 | | 7.288 | | | | 9.803 | |
| $C_6H_6$, Benzene | −9.9299 | | +5.0699 | | 13.8026 | | 19.5593 | | 23.6437 | | 26.6921 |
| B. $\begin{bmatrix} C_nH_m+(n+m/2)CO_2 \rightleftharpoons \\ (m/2)H_2O+(2n+m/2)CO \end{bmatrix}$ | | | | | | | | | | | |
| $CH_4$, Methane | | | −10.597 | | −3.325 | | +1.008 | | 3.8176 | | 5.8658 |
| $C_2H_6$, Ethane | | | −13.57930 | | −1.39617 | | +5.84886 | | +10.61232 | | 13.95718 | 15.27340 |
| $C_6H_{14}$, n-Hexane | | | −28.728 | −10.02 | +3.944 | +14.759 | +23.336 | | 35.848 | | 44.959 |
| $C_2H_4$, Ethylene | | | −6.703 | | +1.552 | | +6.454 | | 9.664 | | 11.915 |
| $C_2H_2$, Acetylene | | | +3.805 | | +7.266 | | +9.294 | | 10.553 | | 11.509 |

NOTE.—All of the above reactions are highly endothermic (in the direction of hydrocarbon-destruction), based on the slopes of plots of $\log_{10}K_{eq}$ v $1/T$, °K.

[1] Given as $\log_{10} K_{eq}$, evaluated as the sum of the $\log_{10} K_f$ of products less the sum of $\log_{10} K_f$ of reactants where $\log_{10} K_f$ is the $\log_{10}$ of the equilibrium constant for formation of the substance from its elements, at the given temperature with all substances in their standard states, and each $\log_{10} K_f$ is multiplied by the coefficient for the number of molecules reacting.

Noting that the water-gas shift equilibrium specifies a relationship between CO, $H_2$, $CO_2$, and $H_2O$, it follows that the equilibrium concentration of any one hydrocarbon would be the same at any one temperature by either of the above two reactions. The values in Table G were calculated by the same general procedures as used for the preceding equilibria. That is, $\log_{10} K_{eq}$ was taken as the sum of the $\log_{10} K_f$ (at the selected temperature) of the products, each multiplied by its coefficient (c or d) in the reaction equation, less the sum of the $\log_{10} K_f$ values (times their coefficients) of the reactants.

The values of $K_{eq}$ given in Table G for ethylene, acetylene, and benzene show, by comparison with those for ethane and n-hexane, that the removal of unsaturated and aromatic hydrocarbons from exhaust gas by the equilibration process will be at least as good as the removal of paraffins in the temperature range of interest.

As noted above, the reaction of hydrocarbons with either $H_2O$ or $CO_2$ will yield identical results in terms of the equilibrium amount of HC remaining at any selected temperature. It cannot be predicted which of the two reactions will occur more readily, so that both are of interest.

The $K_{eq}$ values and calculations made from them (see below) indicate that at higher temperatures, the more complex hydrocarbons have lower equilibrium concentrations than methane, while at quite low temperatures, the opposite is true. However, in an exhaust that is cooling from a higher temperature, where the complex hydrocarbon has already been destroyed, reaction rates decrease with decreasing temperature. There is little likelihood that an appreciable amount of a complex hydrocarbon can be synthesized at the high throughputs required and at the expense of the relatively inert methane already formed from the available reactants, even though the calculated equilibrium concentration of the complex hydrocarbon becomes favorable.

Equilibrium concentrations of selected hydrocarbons (methane, ethane, n-hexane) were calculated by an approach similar to that used for NO. The partial pressures (wet-gas basis; total exhaust pressure, exhydrocarbons=1 atmosphere) of $H_2$, $H_2O$, and $CO_2$ in each of the 24 (4 mixture ratios and 6 temperatures) equilibrated water-gas mixtures have been combined with the three $K_{eq}$ values (for reaction of methane, ethane, and hexane) at the same temperature to find the equilibrium pressure of each of the three hydrocarbons at that temperature in the presence of equilibrated exhaust gas from four different $A/F$ ratios. The results of these calculations are given in Table H which follows in equilibrium partial pressures in atmospheres. Calculated values are plotted on a logarithmic scale in FIGURE 3.

ular weight compounds will serve to further reduce carbon monoxide concentrations and to this extent can aid in reducing the air polluting quality of the exhaust. Equilibration to 981° F. (800° K.) will leave methane as the only appreciable hydrocarbon; it does not contribute to smog. Removal of ethylene, benzene, and acetylene will be better than that of ethane at this temperature, based on inspection of the K values.

The high partial pressures of hydrocarbons calculated for low temperatures and shown in FIGURE 3 would not be realized in practice, because they are calculated for an assumed total pressure *ex-hydrocarbons* of 1 atmosphere, whereas in practice the total pressure *including the hydrocarbons* would be 1 atmosphere. In fact, depletion of the reactants would limit hydrocarbon synthesis to a few volume percent in the equilibrated gas, even with a very active catalyst at low temperatures.

It is to be noted that the hydrocarbon calculations performed in the manner described above give valid equilibrium concentrations for exhaust gases at atmospheric pressure only when the calculated result shows the hydrocarbon concentration to be of the order of several parts per million or less, since in this case the hydrocarbon can be formed from the major constituents ($CO$, $CO_2$, $H_2$, $H_2O$, $N_2$) by negligible changes in their concentrations. Where the hydrocarbon concentration is sufficiently high that it requires appreciable consumption of the major constituents, a more elaborate mathematical treatment is required. This approach is not necessary here since our purpose is to define the temperatures at which hydrocarbon synthesis becomes important rather than the exact composition. In this case, the method used is adequate. For example, referring to FIGURE 3, it is seen that at an $A/F$ ratio of 13 the equilibrium concentration of n-hexane increases from 1 p.p.m. at 500° F. to over 1000 p.p.m. at 450° F. That is, the concentration increases over a thousandfold in a 50° F. interval. It would, therefore, be undesirable to TABLE H.—EQUILIBRIUM PARTIAL PRESSURES OF HYDROCARBONS IN EQUILIBRATED EXHAUST GAS [1]

| $A/F$ Ratio | Hydrocarbon Present | Temperature, °F. | | | | | |
|---|---|---|---|---|---|---|---|
| | | 441 | 801 | 1161 | 1521 | 1881 | 2241 |
| | | Temperature, °K. | | | | | |
| | | 500 | 700 | 900 | 1100 | 1300 | 1500 |
| 9 | Methane: | | | | | | |
| | Atm | 4.10×10⁹ | 22.28 | 2.70×10⁻³ | 6.69×10⁻⁶ | 1.02×10⁻⁷ | 4.78×10⁻⁹ |
| | Log₁₀ P | 8.613 | 1.348 | −2.578 | −5.175 | −6.994 | −8.321 |
| | Ethane: | | | | | | |
| | Atm | 3.76×10¹⁰ | 2.36×10⁻² | 4.01×10⁻⁹ | 1.71×10⁻¹³ | 1.57×10⁻¹⁶ | 9.59×10⁻¹⁹ |
| | Log₁₀ P | 10.575 | −1.628 | −8.397 | −12.766 | −15.805 | −18.018 |
| | n-Hexane: | | | | | | |
| | Atm | 2.05×10²² | 6.14×10⁻¹² | 2.49×10⁻³⁰ | 3.90×10⁻⁴² | 2.61×10⁻⁵⁰ | 2.99×10⁻⁵⁶ |
| | Log₁₀ P | 22.312 | −11.212 | −29.603 | −41.409 | −49.583 | −55.525 |
| 11 | Methane: | | | | | | |
| | Atm | 1.79×10⁶ | 1.692 | 2.50×10⁻⁴ | 6.29×10⁻⁷ | 8.74×10⁻⁹ | 3.68×10⁻¹⁰ |
| | Log₁₀ P | 6.253 | 0.228 | −3.602 | −6.201 | −8.058 | −9.434 |
| | Ethane: | | | | | | |
| | Atm | 1.04×10⁶ | 1.30×10⁻⁴ | 5.48×10⁻¹¹ | 2.57×10⁻¹⁵ | 2.10×10⁻¹⁸ | 1.08×10⁻²⁰ |
| | Log₁₀ P | 6.015 | −3.887 | −10.261 | −14.589 | −17.679 | −19.966 |
| | n-Hexane: | | | | | | |
| | Atm | 9.57×10⁸ | 2.35×10⁻¹⁸ | 1.62×10⁻³⁵ | 3.81×10⁻⁴⁷ | 2.03×10⁻⁵⁵ | 1.55×10⁻⁶¹ |
| | Log₁₀ P | 8.981 | −17.630 | −34.791 | −46.419 | −54.692 | −60.810 |
| 13 | Methane: | | | | | | |
| | Atm | 1.70×10⁴ | 4.17×10⁻² | 9.16×10⁻⁶ | 2.36×10⁻⁸ | 3.00×10⁻¹⁰ | 1.10×10⁻¹¹ |
| | Log₁₀ P | 4.232 | −1.380 | −5.038 | −7.626 | −9.523 | −10.959 |
| | Ethane: | | | | | | |
| | Atm | 2.08×10² | 1.64×10⁻⁷ | 1.52×10⁻¹³ | 7.96×10⁻¹⁸ | 5.73×10⁻²¹ | 3.00×10⁻²³ |
| | Log₁₀ P | 2.319 | −6.785 | −12.918 | −17.099 | −20.242 | −22.522 |
| | n-Hexane: | | | | | | |
| | Atm | 0.0361 | 1.82×10⁻²⁶ | 1.48×10⁻⁴² | 5.39×10⁻⁵⁴ | 2.25×10⁻⁶² | 1.02×10⁻⁶⁸ |
| | Log₁₀ P | −1.442 | −25.739 | −41.830 | −53.269 | −61.648 | −67.994 |
| 15 | Methane: | | | | | | |
| | Atm | | | | | | |
| | Log₁₀ P | | | | | | |
| | Ethane: | | | | | | |
| | Atm | 2.20×10⁻⁸ | 3.20×10⁻¹⁷ | 5.88×10⁻²³ | 3.02×10⁻²⁷ | 2.00×10⁻³⁰ | 6.78×10⁻³³ |
| | Log₁₀ P | −7.658 | −16.495 | −22.230 | −26.519 | −29.700 | −32.169 |
| | n-Hexane: | | | | | | |
| | Atm | 1.88×10⁻²⁹ | 5.94×10⁻⁵³ | 3.45×10⁻⁶⁸ | 1.37×10⁻⁷⁹ | 4.93×10⁻⁸⁸ | 1.36×10⁻⁹⁴ |
| | Log₁₀ P | −28.726 | −52.226 | −67.462 | −78.863 | −87.307 | −93.867 |

[1] As pressure, and log₁₀ of pressure, in atmospheres, for hydrocarbon in equilibrium with exhaust gas (at 1 atm. pressure ex-hydrocarbon) from isooctane as fuel, at indicated $A/F$ ratio and after equilibration (as to water-gas shift) to the indicated temperature.

These values show that catalytic equilibration to as low a temperature as 800° F. will be satisfactory, except for methane and for ethane on very rich mixtures. However, as pointed out, the synthesis of the unreactive, low molecular equilibrate exhaust below 500° F. when operating at 13 $A/F$ ratio. More generally, one can conclude from FIGURE 4 that about 600° F. represents a practical lower limit to the desired range for exhaust equilibration.

HEAT OF REACTION-EQUILIBRATION VS. COMBUSTION

One of the major difficulties in the oxidation, by added air, either catalytically or by a flame, of the CO and hydrocarbons (and $H_2$, as well) in the exhaust gas of an engine is the substantial amount of heat released by the reaction. Overheating and damage of equipment are the results, and avoiding overheating necessitates by-pass devices which defeat the objectives of the equipment.

By contrast, equilibration, taken as a whole, is very mildly exothermic; the hydrocarbon reaction is endothermic, and the NO and water-gas shift reactions are mildly exothermic.

In this section, the heats of reaction of these two processes are compared for a typical rich-mixture condition, using a number of assumptions. The case selected was the previously calculated exhaust-gas composition corresponding to $C_8H_{18}$ fuel at an $A/F$ ratio of 13, with a composition defined by $K_{eq}$ for the water-gas shift reaction of 3.7, i.e., at the 1750° K. (2691° F.) equilibrium composition. This gas, plus 1000 p.p.m. (0.1%) each of NO and n-hexane, is taken at 800° K. (981° F.) as the starting point in the calculation. It is assumed that the gas has cooled from engine temperature to 800° K. without change in composition. At this temperature, two different processes are carried out.

(1) Equilibration consists of establishing the water-gas equilibrium at the 800° K. values (wet-gas basis interpolated from Table B), and destroying NO and hexane by reaction with $H_2$ and $H_2O$, respectively. The over-all heat of reaction is evaluated as the difference between the total enthalpies of the products and reactants, and amounts to —15.736 Kcal./100.2 moles of reactants. The total heat capacity of the reaction products from 100.2 moles of reactants was found to be 0.8388 Kcal./° C. at 800° K., from which it follows that the products (irrespective of quantity) will be 20.8 centigrade degrees (38° F.) warmer than the reactants if no heat has been gained from or lost to the surrounding. Thus the equilibration is found to be very mildly exothermic.

(2) Oxidation involves adding sufficient air (no excess) at 300° K. (80.6° F.) to the exhaust gas at 800° K. (981° F.), oxidizing completely to $CO_2$, $H_2O$, and unchanged $N_2$ and NO, and allowing the product gases to warm up from the heat released. The heat of reaction for 100.2 moles of exhaust gas+14.5 moles of air was found, as the difference between the total enthalpy of the products at 800° K. and the sum of the enthalpies of the exhaust gas at 800° K. and air at 300° K., to be —432.0 Kcal. Assuming a mean temperature of 1000° K. (200° C. higher), the total heat capacity of the products (112.84 moles) is 0.9907 Kcal./° C., from which $\Delta T$ is +436 centigrade degrees under adiabatic conditions.

In summary, equilibration will raise the temperature of the gases by 21° C. (38° F.) and oxidation will increase the temperature by 436° C. (785° F.), both above an initial value of 981° F. If excess air had been used in oxidation, the temperature rise would be less because of a higher total specific heat in the product gases.

This calculation is for a specific but typical case of exhaust gas from an $A/F$ ratio of 13, equilibrated to, or oxidized at, a specific temperature of 800° K. (981° F.). A similar calculation of the case where the $A/F$ ratio is 11/1, leaving much more unburned "fuel," and where water-gas equilibration, or oxidation is at a lower temperature of 700° K. (801° F.), shows a $\Delta T$ of +61 centigrade degrees (110° F.) for equilibration and a $\Delta T$ of +757 centigrade degrees (1363° F.) for oxidation, with the required air for oxidation at 81° F. Both $\Delta T$ values are above 700° K. (801° F.), where the reactions were assumed to occur in this case. In this case, the ratio of $\Delta T$ effects is lower than for the first case (equilibration 8.1% of oxidation vs. 4.8% in the first case), but the absolute differences are even more impressive ($\Delta T$ is 1253° F. greater for oxidation in the second case, vs. 747° F. in the first case).

It is evident from these two cases that equilibration will release far less heat than oxidation in all cases, and therefore avoids any problem of overheating equipment. The need for a mechanism to inject additional air is also avoided, thus presenting an additional advantage for equilibration. When equilibration is effected by a fuel additive, the ultimate goal of air pollution control will be reached without any new or modified vehicle equipment.

From the above it can be seen that of the three pollutant types mentioned above, CO and NO are decreased by equilibration at relatively low temperatures, while the formation of hydrocarbon in increased at low temperatures and decreased at higher temperatures. Thus, the temperatures needed to control the three major pollutants are somewhat antagonistic toward each other. An important aspect of this invention resides in the establishment of chemical equilibrium at certain temperatures which provide acceptable minimum amounts of carbon monoxide and nitrogen oxides, as well as of hydrocarbons higher than methane. Such a temperature is generally between about 400 and 1400° F., preferably 600 to 1200° F., especially preferred 700 to 1100° F., and most preferably 800 to 1000° F.

The method of the invention is capable of handling very high throughputs of gases which are to be reduced in contamination. For instance, throughputs from a typical internal combustion engine can be in the range of up to 1000 v./v. to 40,000 v./v. and higher.

If predominantly CO is to be eliminated, then the temperatures can be within the range of from 200 to 1400° F., preferably 400 to 1200° F., more preferably 600 to 1200° F., and most preferably 800 to 1000° F.

If predominantly nitrogen oxides are to be eliminated, then the temperatures can be within the range of from 400° F. to flame temperature, preferably 600 to 2000° F., more preferably 800 to 1600° F., and most preferably 900 to 1500° F.

If predominantly hydrocarbons (excluding methane) are to be eliminated, then the temperatures can be within the range of from 400° F. to flame temperature, preferably 600 to 2000° F., more preferably 800 to 1600° F., and most preferably 900 to 1500° F.

If the catalyst is present as a fuel additive, then it will be present at some time in the exhaust gas at the proper temperature at which equilibration is desired. If the catalyst is to be used at some location in the exhaust gas emission conduit, then preferably that portion of the emission conduit is selected where the exhaust gases will have cooled to the desired equilibration temperature, i.e., between about 400 to 1400° F.

Equilibration catalysts can also be provided in the exhaust conduit in locations where the temperature is higher than the particularly preferred equilibration temperatures of 600 to 1200° F. in order to preserve the equilibrium while cooling down from combustion chamber temperatures. Thus, one aspect of the invention is not only the use of catalysis to achieve equilibration conditions but the location of the catalyst in that portion of the exhaust conduit where the most desired temperatures exist for exhaust equilibration. These temperatures have been discussed above and are generally in the range of about 400 to 1400° F., but preferably 600 to 1200° F., and most preferably within the range of 800 to 1000° F. Exhaust gases passing over or contacting suitable catalyst in the exhaust conduit at these temperatures will tend to equilibrate in such a manner that the major noxious pollutants will be reduced to an acceptable level.

The invention is further illustrated by the examples below. A large number of catalysts were evaluated for equilibrium reactions of exhaust gas by the following experimental procedure. Fifty cc. of 1/8 to 3/16 inch catalyst was used in a fixed bed, downflow reactor. The catalyst bed depth was 4.5 inches in an 11 to 28 mm. annulus between two Vycor tubes. Gaseous feeds, simulating an average exhaust gas, were metered by rotameters, and liquid water was pumped in through a vaporizing zone.

The feed components consisted of air, $CO_2$, $N_2$ and two mixtures: 2.8% NO in $N_2$, and 1.5% n-butane, 1.5% butene-1, 27.5% $H_2$ and 69.5% CO. These were metered to approximate the over-all mol percent composition 70.5% $N_2$, 14.0% $H_2O$, 10.5% $CO_2$, 3.0% CO, 1.2% $H_2$, 0.6% $O_2$, 0.12% NO, 0.06% butene-1 and 0.06% n-butane. Analyses of the feed showed its actual composition. This gaseous mixture was fed at an over-all rate of 1000 to 10,000 volumes of gas (STP) per volume of catalyst per hour. The tests were at atmospheric pressure and at temperatures in the 700–1100° F. range.

The analyses for hydrogen, $CO_2$, $O_2$, CO, and hydrocarbons were made by gas chromatography. Nitric oxide was determined by wet chemical analysis on spot samples.

*Example I*

An Imperial Chemicals Industries 8% $Cr_2O_3$–92% $Fe_2O_3$ commercial water-gas shift catalyst (ICI No. 8278) was evaluated, as described above, to determine whether it would catalyze the reaction of hydrocarbons, convert NO to $N_2$ and convert CO and $H_2O$ to $CO_2$ and $H_2$. At temperatures of 800–1000° F., and a feed rate of 1000 v./v. hr., it converted 70–80° of the butene in the feed and 0–20% of the n-butane. The nitric oxide was completely removed and 80 to 90 percent of the carbon monoxide was removed. These results are summarized in the following Table I:

TABLE I

| Temperature, °F | Percent Conversions | | |
|---|---|---|---|
| | 815 | 900 | 1,000 |
| Butene-1 | 71 | 75 | 84 |
| n-Butane | 0 | 0 | 20 |
| NO | 100 | 100 | 100 |
| CO | 90 | 85 | 80 |

These results indicate that the standard shift catalyst has some activity at 1000° F. for removing paraffins from exhaust gas, although somewhat lower than is desired. It has good activity at these conditions for NO, CO and unsaturates.

*Example II*

Town gas manufacture involves the reaction of higher hydrocarbons with steam to produce methane, $H_2$, CO and $CO_2$. Usually it uses about 500 p.s.i.g. pressure to attain this. Essentially it reacts higher hydrocarbons with steam to produce methane rich fuel gas. One of the best known catalysts for town gas production comprises nickel on alumina, promoted with a small amount of a potassium compound. It was not known whether such a catalyst would be effective at atmospheric pressure for equilibrating exhaust gas.

Such a catalyst was prepared in the laboratory by coprecipitating sodium aluminate with nickel nitrate, washing, and adding 2% $K_2CO_3$. The resulting catalyst composition was 55.7 $Al_2O_3$–43.7 Ni–2 $K_2CO_3$ (parts by wt.).

When tested without a preliminary hydrogen reduction, this catalyst was slightly less active, at 900° F. and 1000 v./v./hr., than the iron type shift catalyst of Example I for converting butene-1 and CO, and it removed all of the nitric oxide. Results are summarized below in Table J.

TABLE J

| Temperature, °F | Percent Conversions | | |
|---|---|---|---|
| | 710 | 915 | 1,100 |
| Butene-1 | 34 | *58(75) | 100 |
| n-Butene | 0 | 0(0) | 74 |
| NO | 0 | 100(100) | 100 |
| CO | 28 | 79(85) | 65 |

Values in parentheses are for the $Fe_2O_3$ shift catalyst of Example I.

*Example III*

A catalyst was made by simultaneously adding two solutions at equal rates to 4 liters of water containing 17 g. sodium carbonate. One solution contained 735 g. $Al(NO_3)_3 \cdot 9H_2O$ and 466 g. of $Ni(NO_3) \cdot 6H_2O$ diluted to 2000 cc.; and the other contained 180 g. $Na_2CO_3$ and 317 cc. of 50% NaOH diluted to 2000 cc. A precipitate was obtained, filtered, thoroughly washed, and mixed with 200 cc. of a solution containing 8.3 g. of $K_2CO_3$. The resulting mixture was dried at 250° F. and calcined five hours at 800° F. Its composition was 50 $Al_2O_3$–47 Ni–3 K (parts by wt.).

This catalyst was evaluated at 900 and 1100° F. and then was reevaluated at 900° F. It was then reduced with hydrogen for an hour at 1100° F. and reevaluated at 700° F. Results are given in Table K which follows.

TABLE K

| | Percent Conversions at 1,000 v./v./hr. | | | |
|---|---|---|---|---|
| Catalyst reduction | None | | $H_2$, 1,100° F. | |
| Equilibration Temp. °F | 900 | 1,100 | 900 | 700 |
| Butene-1 | 46 | 100 | 100 | 100 |
| n-Butane | 3 | 100 | 90 | 100 |
| NO | 100 | 100 | 100 | 100 |
| CO | 65 | 54 | 80 | 96 |

These results show that the catalyst became more active when used on feed at 1100° F., but increased to even higher activity when reduced for one hour with hydrogen at 1100° F. This indicates that activation with feed alone requires a longer time.

*Examples IV through VII*

Other active nickel catalysts for exhaust gas equilibration were made using barium as a promoter and stabilizer, instead of potassium. Active catalysts were obtained either by homogeneously coprecipitating aluminum and nickel, or by precipitating aluminum hydroxide on nickel carbonate or nickel formate. The barium can be added as the hydroxide, nitrate, acetate or other soluble decomposable compound.

Catalysts made by these methods are superior to those made by impregnating activated aluminas with nickel and barium nitrates and then calcining. The superior catalysts give relatively high yields of methane at temperatures of 700° F. and lower, even at atmospheric pressure. This also indicates they are excellent catalysts for making town gas at elevated pressures. A catalyst of this general composition, but made by a different and more expensive method which does not give homogeneous coprecipitation, has been disclosed for making town gas in pending application Ser. No. 317,789, filed Oct. 21, 1963, in the names of Taylor and Sinfelt. The catalysts described in Examples IV–VII are improvements over those in said Ser. No. 317,789. The catalysts of these examples have superior stability and mechanical strength resulting in longer catalyst life, and in a lower cost of manufacture.

*Example IV*

50 $Al_2O_3$–47 Ni–6 Ba (parts by wt.) (coprecipitate, some carbonate, Ba$(OH)_2$)

A 3 l. solution of 1400 g. $Ni(NO_3)_2 \cdot 6H_2O$ and a 3 l. solution of 737 g. $NaAlO_2$ were added at equal rates to 10 l. of $H_2O$ with vigorous stirring. The pH was adjusted from 3 to 8 by adding 400 cc. of solution containing 102 g. $Na_2CO_3$. The precipitate was filtered, washed, reslurried in 4 l. $H_2O$ containing 10 cc. $HNO_3$, and again filtered and washed. It was then mixed with an 80° C. mixture of 82.7 g. $Ba(OH)_2 \cdot 8H_2O$ in 200 cc. $H_2O$. The product was dried at 250° F. and calcined at 800° F. It was very soft and light weight. It was mixed with 10% Sterotex and pilled. The Sterotex was removed by heating 15 hours at 900° F. in the muffle furnace.

Example V

50 Al₂O₃–47 Ni–6 Ba (parts by wt.) (Copp't, acetic acid peptized) (inhomogeneous)

A 2 l. solution of 368.5 g. NaAlO₂ was slowly stirred into a 6 l. solution of 700 g. Ni(NO₃)₂·6H₂O. The NaAlO₂ solution also contained 30 cc. of 50% NaOH solution. The final pH was above 8. Then 25 cc. of conc. HNO₃ was added back to adjust to 7. After standing 1 hour, the precipitate was filtered and washed with 4 l. dist. H₂O. The coke was thoroughly mixed with a solution of 38.2 g. Ba(OH)₂·8H₂O in 200 cc. H₂O and 45 cc. glacial acetic acid. The slurry was dried at 250° F. and calcined 5 hours at 800° F. The product was granular, with no large lumps.

Example VI

50 Al₂O₃–47 Ni–4.5 Ba (parts by wt.) (Use of NiCO₃, single precipitation of Al(OH)₃)

570 g. of nickel carbonate (City Chemical Co.) was stirred in 8 l. H₂O while adding at equal rates a 3 l. solution of 520 g. NaAlO₂ and a 3 l. solution of 655 g. Al(NO₃)₃·9H₂O. The slurry of pH=8 was mixed with a solution of 68.5 g. Ba(NO₃)₂ in 400 cc. H₂O for 15 minutes and was filtered and washed with 4 l. H₂O. The filtrate and wash water contained half of the Ba. Then, a solution of 34.3 g. Ba(NO₃)₂ in 2.5 l. H₂O was passed through the cake, and it retained half of this Ba. Estimated Ba content at 4.5%. The coke was dried and calcined 5 hours at 800° F. to give soft granules. These were tested as is and after pelleting with 5% Sterotex (completely hydrogenated cottonseed oil).

Example VII

Impregnated type (83 Al₂O₃–17 Ni–3 Ba)

650 cc.=544 g. of Alcoa H-141, ⅛ inch spheres of active alumina was evacuated and then wet with a solution of 544 g. Ni(NO₃)₂·6H₂O in 200 cc. H₂O. The drained solids were calcined 5 hours at 800° F., cooled and reimpregnated with the drained nickel nitrate solution. This product was dried and calcined and then impregnated with 500 cc. of a solution containing 37.5 g. Ba(NO₃)₂. It was again dried and calcined 5 hours at 800° F.

The results of Examples IV–VII are summarized below in Table L.

Example VIII

An active catalyst was also obtained when cobalt was substituted for nickel in a preparation in which 28 wt. percent cobalt nitrate and 28 wt. percent sodium aluminate solutions were added simultaneously to distilled water. The resulting precipitate was washed and mixed with barium acetate containing a small excess of acetic acid and was dried at 300° F. It was then calcined in hydrogen at increasing temperatures to 1100° F. Its composition, expressed in proportions by weight, was 50 Al₂O₃–47 CO–6 Ba.

It will be understood that the barium and some of the cobalt or nickel in these preparations has not been reduced to the metallic state, and the parts by weight indicate relative amounts, rather than actual compounds present.

The cobalt catalyst was effective in purifying simulated exhaust gas, although it had lower initial activity than similar nickel catalysts. At 10,000 v./v./hr. and 905° F., this catalyst gave complete removal of butene-1 and nitric oxide, and 81 and 82% removal of the n-butane and carbon monoxide, respectively. At 725° F., the product gas contained 0.05% methane, indicating an advantage over nickel, when methane formation is to be minimized.

Example IX

Activated carbon supported catalysts are operable under equilibrating reaction conditions, whereas they would be burned up if used with excess air for oxidation of exhaust gas. Also activated carbon is noteworthy for its ability to adsorb hydrocarbons in the presence of water vapor. These considerations suggested its use as a support for ruthenium, an element previously known to be active for Town gas-type reactions.

A catalyst containing one percent Ru on activated carbon was active at 700° F. for converting butene, and at 900° F. for converting both butene and butane. When the temperature was increased to 1100° F., the conversion of butene and butane was maintained, but there was a net make rather than consumption of CO, indicating this is too high a temperature for carbon base catalysts. At 1100° F. the CO concentration in the product was 4.0% as compared with 3.4% in the feed. Removal of nitric oxide was complete at all three temperatures.

TABLE L.—EVALUATION OF CATALYSTS ON SIMULATED [1] EXHAUST GAS

[10,000 v./v./hr., 1.0 atmospheres pressure]

| Example | IV | | V | | VI | | VII | |
|---|---|---|---|---|---|---|---|---|
| Composition, Wt. Percent: | | | | | | | | |
| Al₂O₃ | 50 | | 50 | | 50 | | 83 | |
| Ni | 47 | | 47 | | 47 | | 17 | |
| Ba or K | 6Ba | | 6Ba | | 6Ba | | 3Ba | |
| Prep. Method | Copp't+Na₂CO₃ | | NaAlO₂–Acetic Acid Peptized | | Al(OH)₃ on NiCO₃ | | Impregn. Act. Al₂O₃ | |
| Temperature, °F | 700 | 900 | 700 | 800 | 700 | 900 | 700 | 900 |
| Percent Conversion: | | | | | | | | |
| n-Butene-1 | 100 | 100 | 100 | 100 | 100 | 98 | 41 | 100 |
| n-Butane | 92 | 100 | 100 | 100 | 100 | 100 | 25 | 99 |
| CO | 96 | 82 | 97 | 74 | 94 | 95 | 43 | 83 |
| NO | 100 | 100 | 100 | 100 | | 100 | 51 | 100 |
| Percent CH₄ in Product | 0.86 | 0.20 | 0.849 | 0.21 | 0.92 | 0.15 | 0.08 | 0.07 |

[1] Feed Composition, Mol. Percent: N₂, 70.5; H₂O, 14.0; CO₂, 10.5; O₂, 0.6; NO, 0.12; CO, 3.0; H₂, 1.2; nC₄, 0.06; C₄=1, 0.06; CH₄, 0.00.

The above examples disclose new and superior techniques for making Town gas catalysts, in addition to their use for exhaust gas equilibration.

Active catalysts have also been made comprising nickel and barium on other supports, such as zirconia, calcium silicate, calcium aluminate and diatomaceous earth. Aluminum silicates, such as clays, may also be used as supports. It is preferable, in coprecipitating these catalysts, to add two participating streams simultaneously, rather than to add one solution to the other, in order to obtain homogeneous rather than inhomogeneous coprecipitation.

Results of these tests are summarized below in Table M:

TABLE M

| | Percent Conversions | | | |
|---|---|---|---|---|
| Temperature, °F | 715 | 930 | 1100 | 900 |
| Hours | 0.42 | 2.0 | 2.8 | 3.65 |
| Butene-1 | 95 | 100 | 100 | 100 |
| n-Butane | 3 | 95 | 100 | 100 |
| NO | 100 | 100 | 100 | 100 |
| CO | 27 | 74 | −19 | 79 |

The above results indicate the activated carbon may begin to react with $H_2O$ and $CO_2$ at 1100° F. Less reactive carbons can overcome this difficulty.

Example X

A catalyst containing 2% ruthenium on one-eighth inch activated alumina (Harshaw 1404T) was very active for equilibration reactions. At 710° F., it converted all of the butene, 78% of the butane and 88% of the carbon monoxide. Conversions of hydrocarbons were complete at 900 and 1100° F. They were also complete when the 0.4% oxygen in the feed was absent. The conversions of NO remained complete, but those of CO showed a progressive decrease with increasing temperature as expected from the previously described equilibrium considerations.

Results of these tests are summarized below in Table N.

TABLE N

| Feed | Percent Conversions | | | |
|---|---|---|---|---|
| | With 0.4 $O_2$ | | No $O_2$ | |
| | 710° F. | 910° F. | 910° F. | 1,100° F. |
| Butene-1 | 100 | 100 | 100 | 100 |
| n-Butane | 78 | 100 | 100 | 100 |
| NO | 100 | 100 | 100 | ---- |
| CO | 88 | 72 | 82 | 48 |

This catalyst made appreciable amounts of methane which indicates it would also be active for making Town gas at low pressures. The methane in the product decreased from 0.54% at 710° F. to 0.003% at 1100° F. The 0.54% compares with a theoretical maximum of 0.6% from the $C_4$'s in the feed.

More extensive tests were made on the same catalyst charge to determine the effect of removing the $CO_2$ or the $H_2O$ from the feed, in addition to removing the air. At 900° F., the results showed complete conversion of the butene, butane and NO with either $H_2O$ or $CO_2$ as the reacting medium. When $CO_2$ was omitted from the feed, the conversion of CO was increased, and when water was omitted, there was a net make of carbon monoxide. These results are summarized below in Table O.

TABLE O

| Feed—0.4% $O_2$, 12% $CO_2$, 10.5% $H_2O$ | Percent Conversions at 900° F. | | | |
|---|---|---|---|---|
| | Air | No Air | | |
| | $CO_2$, $H_2O$ | $CO_2$, $H_2O$ | No $CO_2$, $H_2O$ | $CO_2$, No $H_2O$ |
| Butene-1 | 100 | 100 | 100 | 100 |
| n-Butane | 94 | 100 | 100 | 100 |
| NO | ---- | 100 | 100 | 100 |
| CO | 70 | 72 | 92 | −40 |

This example shows air ($O_2$) is not required for equilibration, and that hydrocarbons can react with either $H_2O$ or $CO_2$. One effect of air in the feed is to reduce the amount of methane formed by about fifty per cent. The effect of more air is important for engines using lean fuel mixtures.

Example XI

A platinum on alumina catalyst had a somewhat lower activity than ruthenium or nickel on alumina catalysts. A typical naphtha hydroforming catalyst containing 0.3% platinum on activated alumina was evaluated at only 1000 v./v./hr. at 700° F. It gave complete conversion of butene and nitric oxide and 81 and 96% conversion of the n-butane and carbon monoxide, respectively. The percent of methane in the exhaust gas was 0.2 percent.

It should be noted that this catalyst is better than nickel catalysts for the oxidative purification of exhaust gas, but is inferior to nickel for exhaust gas equilibration. The same is true of catalysts containing cobalt, copper and vanadium which has been used for oxidation. Such oxidation-type catalysts can be used in conjunction with equilibration catalysts either as mixtures or as separate portions of the catalyst bed. For example, a layer of a platinum or copper catalyst may precede a nickel equilibration catalyst, or a water-gas shift catalyst. In the latter case, the oxidation catalyst can serve to oxidize hydrocarbons, while the shift catalyst reduces the content of carbon monoxide.

Example XII

In order to demonstrate that exhaust gas equilibration catalysts such as described in the foregoing examples can effect equilibration reactions in actual exhaust gases, a test was made in a unit especially designed for the evaluation of fixed bed catalysts employing exhaust gases from a single cylinder, spark-ignited, gasoline engine. The engine was a standard CFR engine equipped with a variable compression cylinder. The exhaust gases from this engine passed into an insulated expansion chamber to partially reduce the severity of the pulsating flow from the engine and from there through an externally heated transfer pipe to a stainless steel reactor holding 500 cc. of catalyst. The reactor was insulated and heated electrically to prevent loss of heat. The reactor was, therefore, essentially adiabatic.

A bypassing sysem and throttling valves were used to regulate the flow of exhaust to the reactor. An orifice before the reactor allowed the measurement of the flow to the reactor. With this unit, it was, therefore, possible to control the reactor temperature and the space velocity of exhaust gases over the catalyst. By adjusting the air/fuel ratio of the engine, the composition of the exhaust gases entering the catalyst bed could also be controlled. Sampling taps were placed on the inlet and outlet side of the bed. The sample gases were withdrawn continuously and passed into a Beckman Model 15A infrared gas analyzer to determine carbon monoxide and carbon dioxide. Batch samples were obtained for the determination of hydrocarbons by gas chromatography and nitrogen oxides by the phenol disulphonic acid procedure. The analytical methods used are all known to the art.

For the exhaust gas equilibration test, a 500 cc. charge of a nickel on alumina catalyst promoted with barium was used. The calcined catalyst, after charging to the reactor, was heated to 1100° F. in a flowing atmosphere of hydrogen and nitrogen and reduced in this manner for several hours.

Exhaust gases from the CFR engine were passed over the catalyst at 10,000 v./v./hr. space velocity at a temperature of 900° F. The CFR engine was operated on pure isooctane at part throttle conditions at 1900 r.p.m. Samples taken a few hours from the beginning of the run yielded composition data summarized in Table P.

TABLE P

| | Exhaust Gas Composition | | Percent Conversion |
|---|---|---|---|
| | Reactor Inlet | Reactor Outlet | |
| Hydrocarbons (v.p.p.m.): | | | |
| Methane and Ethane | 545 | 509 | 6.6 |
| Ethylene | 322 | 0 | 100 |
| $C_4$ | 278 | 4.5 | 98 |
| Isooctane | 263 | 23 | 91 |
| Nitric Oxide (v.p.p.m.) | 155 | 6.5 | 96 |
| Carbon Monoxide (vol. percent) | 2.93 | 0.66 | 77 |
| Carbon Dioxide (vol. percent) | 11.89 | 13.24 | ---- |
| Oxygen (vol. percent) | 0.15 | 0.15 | ---- |

These data show that exhaust equilibration reactions were occurring in the system. Hydrocarbons higher than methane were largely eliminated as was nitric oxide. The carbon monoxide concentration was reduced substantially and is very close to its equilibrium composition.

A single component fuel was used in this test to simplify the analysis of the exhaust hydrocarbons. However, a similar result would be obtainable with a commercial gasoline.

Further evidence of the occurrence of exhaust equilibration was given by the observed bed temperatures. Thermocouples placed at the inlets and outlets to the bed and at one-fourth, one-half and three-fourths of the total bed depth all were no greater than 5° F. from the average bed temperature of 900° F. If the above reactions had come about by oxidation reactions, substantial temperature rises would have been observed.

*Example XIII*

The following example shows the use of a fuel additive to effect a reduction in air-polluting, exhaust-gas constituents by promoting the achievement of thermodynamic equilibrium in the cooling gas.

A single cylinder CFR engine, coupled to an eddy-current dynamometer, fitted with the Radical-Dome-Head (RDH) cylinder head, piston, connecting rod, and crankshaft configuration, and supplied with controlled amounts of air and fuel by timed fuel injection into the controlled air flowing through the intake air duct external to the engine cylinder is fitted at the exhaust port with an insulated, internally baffled, cylindrical reactor vessel provided with several temperature-sensing devices and gas-sampling taps. Internal volume of the reactor is equal to about seven times the displacement volume of the engine cylinder. The exhaust gas exiting the reactor vessel passes thence to a conventional exhaust duct and stack.

Gases sampled from any of the several sampling taps of the reactor vessel, e.g., immediately outside the engine and at the exit from the reactor vessel, are desired and continuously analyzed by instrumental methods known in the art such as infrared absorbtion, flame ionization, etc., for the volume percent (mol percent) $CO_2$, CO and $O_2$ and for the p.p.m. (by volume) of unburned hydrocarbons. A conventional hydrogen-sensitive thermal conductivity type exhaust-gas analyzer calibrated for $A/F$ ratio is also used as a semiquantitative indicator of hydrogen content of the gas; increase in hydrogen content results in a reading of an apparently richer mixture (lower $A/F$ ratio).

When the engine is operated at 1000 r.p.m. under light load conditions, temperatures from about 1100° F. to about 600° F. are observed along the length of the reactor vessel. Temperatures may be varied by means of controls on the ignition spark timing and $A/F$ ratio or by increasing the air flow or engine power output. When using a fuel blend consisting of 70 parts by volume of isooctane and 30 parts by volume of toluene and operating the engine on an $A/F$ ratio of about 13 lbs. air/lb. fuel, gas analysis results at any sample taps in the reactor vessel are approximately as shown in Table Q below:

TABLE Q

| | |
|---|---|
| Percent $CO_2$ | 13.3 |
| Percent CO | 3.3 |
| Percent $O_2$ | 0.1 |
| $A/F$ ratio meter | 13.0 |
| Hydrocarbons, p.p.m.[1] | 300 as $C_6$ |
| Hydrocarbons, p.p.m.[2] | 6000 as C |
| Nitric oxide, p.p.m. | 500 |

[1] By nondispersive infrared, n-hexane sensitized.
[2] By flame ionization analysis.

When the fuel supply is changed without changing engine conditions to a blend comprising the same base fuel as specified above, but containing about 15 milligram mols of nickel per U.S. gallon in the form of a gasoline-soluble nickel additive nickelocene, the content of CO and hydrocarbons in the exhaust gas at the reactor tap nearest the engine decrease appreciably and the $CO_2$ content increases while at the tap furthest along the reactor axis from the engine even greater changes are observed.

Similarly, the thermal conductivity hydrogen detector shows progressive increases in hydrogen content of the exhaust gas along the length of the reactor and nitric oxide is reduced to substantially zero. These observations are in accord with the equilibrium-seeking changes predicted by our thermodynamic analysis.

Gasoline-soluble nickel compounds suited to this invention include the nickelocene of this example, nickel carbonyl, nickel naphthenate, cyclopentadienyl nickel nitrosyl and the like. Gasoline-soluble compounds of iron, cobalt, ruthenium, other elements from Group VIII of the Periodic Chart of the atoms, vanadium, chromium, molybdenum, tungsten, manganese or copper are also effective.

In sum, exhaust gas equilibration represents a major advance over afterburning in that it controls all three major exhaust pollutants in a single process and requires no added air ($O_2$) in the exhaust. Furthermore, the overall equilibration process is only mildly exothermic compared to afterburning. Thus, expensive heat resistant alloys and complicated bypassing systems to prevent overtemperaturing are avoided. As a result, exhaust equilibration offers a substantially cheaper method of control.

The underlying theory of this new approach has been confirmed by demonstrating the existence of catalytic systems which can promote the equilibration reactions at the temperatures and high flow rates characteristic of automotive exhaust gases. As can be seen from Example X, a 2% ruthenium-on-alumina catalyst gave over 80% conversion of carbon monoxide and essentially 100% conversion of both hydrocarbons and nitric oxides with a synthetic exhaust gas at 900° F. Similar and better results can be achieved with other catalysts.

Although the above invention has been described with a certain degree of particularity, it will be understood that numerous modifications and variations can be employed and still be within the scope of the invention as set forth in the following claims.

What is claimed is:

1. A method of reducing the quantity of carbon monoxide, unburned hydrocarbons, and nitrogen oxides present as pollutants in exhaust gases of internal-combustion engines, said exhaust gases comprising $CO_2$, $H_2$, $H_2O$, $N_2$ and a small amount of oxygen which remains unreacted in the engine, which comprises contacting said exhaust gases without adding external $O_2$ or air at temperatures within the range of 200° to 1400° F. with an active catalyst consisting essentially of reduced nickel on alumina and a small amount of a promoter selected from the group consisting of alkali and alkaline earth metals to promote simultaneously the reaction of CO with $H_2O$ to form $CO_2$ and $H_2$, the reaction of said unburned hydrocarbons with $H_2O$ to form $CO_2$ and $H_2$ and the reduction reaction of said nitrogen oxides by which $N_2$ is formed in the vapor phase and principally at temperatures in the range of 400° F. to 1400° F. so that said pollutants are substantially eliminated from the exhaust gases contacted with the catalyst.

2. A method according to claim 1 wherein said catalyst contains 20 to 50 wt. percent nickel and 3 to 20 wt. percent barium as promoter on the alumina.

3. A method according to claim 1 wherein the active catalyst contains about 47 wt. percent nickel, about 50 wt. percent alumina, and the promoter in a small amount.

4. A method according to claim 1 wherein the exhaust gases are cooled on being brought into contact with the catalyst to temperatures in the range of 600° F. to 1200° F. to obtain nearly complete conversion of the pollutants including butene-1 and n-butane as unburned hydrocarbons, NO as a nitrogen oxide, and CO to unobjectionable components including $CO_2$, $H_2O$, $H_2$, $N_2$, and a small amount of methane.

5. A method according to claim 1 wherein said catalyst is contacted with the exhaust gases at an average temperature of about 900° F.

6. A method according to claim 1 wherein the active catalyst has higher activity in being formed by coprecipitating hydroxides and carbonates of nickel and aluminum, admixing a promoter metal compound which is decomposable to the resulting coprecipitate, drying and calcining the resulting mixture, and reducing the nickel in the mixture by hydrogen.

References Cited

UNITED STATES PATENTS

| 1,867,325 | 7/1932 | Neville | 23—2 |
| 3,086,839 | 4/1963 | Bloch | 23—2 |
| 3,168,368 | 2/1965 | Mills | 23—2 |
| 3,170,758 | 2/1965 | Honerkamp | 23—2 |
| 3,179,488 | 4/1965 | Appell | 23—2 |

EARL C. THOMAS, *Primary Examiner.*